United States Patent [19]

Herron

[11] 4,111,588

[45] Sep. 5, 1978

[54] DRILLING HOLES IN PRESSURIZED PIPES

[75] Inventor: Keith Roderick Herron, Moorooka, Australia

[73] Assignee: James Kemp & Co. Pty. Ltd., Currumbin, Australia

[21] Appl. No.: 756,544

[22] Filed: Jan. 3, 1977

[51] Int. Cl.² .................. B23B 41/08; B23B 35/00
[52] U.S. Cl. ............................. 408/110; 408/1 R; 137/318
[58] Field of Search ................... 408/1, 110, 111; 137/318

[56] References Cited

U.S. PATENT DOCUMENTS

| 3,131,712 | 5/1964 | Risley et al. | 137/318 |
| 3,240,227 | 3/1966 | Burkholder | 137/318 |

Primary Examiner—Othell M. Simpson
Assistant Examiner—Horace M. Culver
Attorney, Agent, or Firm—Haseltine, Lake, & Waters

[57] ABSTRACT

An apparatus for drilling pipes or containers under pressure employing a drill support device attachable to a surface of the pipe or container and having peripheral sealing means between said device and said container. A seal across an aperture in said device has sectoral leaves normally closed by the pressure to seal the aperture but able to be opened inwards to pass a drill.

1 Claim, 2 Drawing Figures

DRILLING HOLES IN PRESSURIZED PIPES

BACKGROUND OF THE INVENTION

THIS INVENTION relates to the problem of drilling holes in a container or pipe for fluids under pressure, as is required for example when fitting ferrules or other equipment.

If such a hole is to be drilled the pipe or container is usually de-pressurized, the hole drilled, the required equipment fitted, and pressure re-applied.

This requires taking the pipe or container out of service for some time, which is obviously undesirable.

SUMMARY OF THE INVENTION

It has been proposed to drill within a pressuretight fitting, without depressurizing, but equipment for this is complicated, expensive and bulky.

The term "container" as used in this specification shall hereafter be construed as including a "pipe".

It is an object of this invention to enable drilling and placement of equipment in the hole without depressurizing and with simple equipment suitable for a wide-range of standard drilling machines.

In one aspect, the invention resides in apparatus for drilling a hole in a pressurized container comprising:
  attachment means for attaching a drill supporting device to a surface of said container;
  peripheral sealing means between said device and said surface surrounding an aperture for a drill in said device;
  a seal across said aperture closed by outward pressure, but able to be opened inwards to pass said drill;
  said seal including resilient sectoral leaves angled inwards towards said surface, which in closed position are abutted tightly against one another to close said aperture;
  each said leaf having a flange abutting against a flange on said attachment means in closed position, to restrain flexing of said leaf away from said surface.

In a further aspect, the invention resides in a method of drilling a hole in a pressurized container comprising:
  attaching a drill-support device to a surface of said container by attachment means;
  providing resilient sealing means between said device and said surface surrounding an aperture for a drill in said device;
  providing a seal across said aperture closed by outward pressure, but able to be open inwards to pass said drill;
  said seal including resilient sectoral leaves angled inwards towards said surface, which in closed position are abutted tightly against one another to close said aperture, each said leaf having a flange abutting against a flange on said attachment means in closed position, to restrain flexing of said leaf away from said surface;
  attaching said drill to said device to allow a drill-bit to pass through said aperture, rotatably driving said drill-bit and axially feeding said drill-bit to project from said drill through said aperture to engage said surface and to drill a hole therethrough.

The sectoral leaves are preferably formed with edge flanges abutting with each other in closed position.

SHORT DESCRIPTION OF THE DRAWINGS

In order that the invention may be better understood, an example of apparatus for a method of drilling a pipe for insertion of a ferrule will be described by way of example.

DETAILED DESCRIPTION OF THE PREFERRED EMBODIMENT OF THE INVENTION

Figure 1:
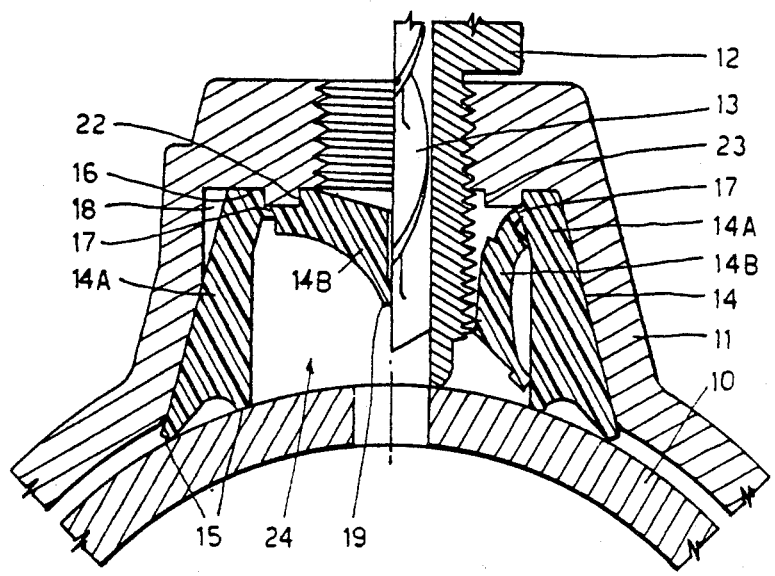
FIG. 1 shows in section part of the pipe drilling apparatus.

Referring first to FIG. 1, the left half of the figure shows the seal in "closed" position (drill withdrawn) while the right half shows the seal in "open" position surrounding a drill device.

A pipe 10 is surrounded by a clamp 11 which retains a sleeve-like drilling device 12 in place, carrying a rotary drill-bit 13.

Clamp 11 may be of any suitable type holding device 12 firmly on pipe 10. For example, clamp 11, may have radial pairs of lugs drawn together by bolts, or a hinge on one side and bolted lugs on the other.

A resilient seal 14 is mounted within device 12 and surrounds drill-bit 13.

Seal 14 consists of an upright body 14A and three flexible leaves 14B.

Body 14A seals peripherally to pipe 10 with a double-lipped seal 15 and at the top is engaged in an annular recess 16 in clamp 11.

A sprigot 18 on body 14A may be provided engaging with a radial groove in clamp 11 to locate seal 14 angularly in relation to pipe 10.

Figure 2:
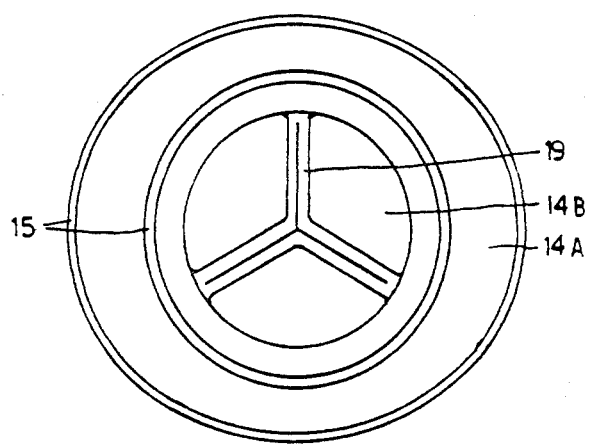
FIG. 2 shows an inverted plan view of the seal of FIG. 1 in "closed" position.

Leaves 14B are sectoral and are joined to body 14A by a narrow portion 17 to give greater flexibility. The edges of leaves 14B have lips 19 at their lower ends, which meet in "closed" position to seal to one another (FIG. 2).

A flange 22 butts in "closed" position against a flange 23 on clamp 11.

The downward inclination of leaves 14B, their relatively thick butting lips 19 and the abutment of flanges 22, 23 prevents leaves 14B being forced upwards beyond the position shown on the left in FIG. 1. The leaves are, however, easily deflected downwards to "open" position about narrowed portions 17 by insertion of drilling device 12 as shown at the right in FIG. 1.

In operation, clamp 11 is attached to pipe 10 enclosing seal 14; drilling device 12 is threaded into clamp 11 and drill-bit 13 passed down through seal 14 to drill a hole in pipe 10.

During drilling, the pressure from the interior of pipe 10 eventually has access to chamber 24 within seal 14, but the seal is maintained by the fit of the threads between device 12 and clamp 11 and the seal between lips 15 and pipe 10, so that substantially no leakage occurs.

The hole having been completed, the drill device 12 may be withdrawn and the resilience of leaves 14B causes them to move to "closed" position (FIG. 2), where they are held tightly by the pressure from the pipe to seal off the pipe pressure from the entry for device 12. Other equipment or tools (such as a top or a valve or ferrule inserter) may be then introduced through seal 14 in similar manner.

As previously mentioned, the invention is clearly applicable to forming a hole in any container, not only in a pipe.

Any leakage via the flutes of drill 13 is usually small, and can be further reduced by using very short fluting, so that the unfluted shank of the drill plugs the hole while it is being drilled.

Various other changes and modifications may be made in the arrangement described without departing from the invention as claimed.

I claim:

1. Apparatus for drilling a hole in a pressurized container comprising:

attachment means for attaching a drill supporting device to a surface of said container including a chamber, said device having an interior wall portion, said interior wall portion being entirely lined;

peripheral sealing means between said device and said surface surrounding an aperture for a drill in said device, said peripheral sealing means comprising an annular resilient lining in said chamber, sealed to said surface;

a seal across said aperture closed by outward pressure, but able to be opened inwards to pass said drill; said seal and said peripheral sealing means being non-rotatably mounted with respect to said attachment means;

said seal including resilient sectoral leaves angled inwards towards said surface, which in closed position are abutted tightly against one another to close said aperture; said sectoral leaves having edge flanges abutting with each other in closed position;

each of said leaves having a flange abutting against a flange on said attachment means in closed position, to restrain flexing of said leaf away from said surface;

said sectoral leaves being integral with said annular lining and connected thereto by narrow flexible portions, the top portion of said seal being recessed, said seal being adapted to varying dimensions and curvatures of said container.

* * * * *